United States Patent Office 3,193,559
Patented July 6, 1965

3,193,559
NEW DERIVATIVES OF 2-OXAZOLIDINONES
Gilbert L. Regnier, Sceaux, Roger J. Canevari, L'Hay-les-Roses, and Jean-Claude R. Le Douarec, Versailles, France, assignors to Société en nom collectif dite: "Science Union et Compagnie—Societe Francaise de Recherche Medicale," Suresne, Seine, France, a corporation of France
No Drawing. Filed Apr. 4, 1962, Ser. No. 184,926
Claims priority, application France, Apr. 4, 1961, 857,672, Patent 1,301,267; July 4, 1961, 866,961, Patent M 1,421
15 Claims. (Cl. 260—307)

This invention relates to novel compositions having valuable therapeutic activity and deriving from 2-oxazolidinone. The invention comprises a method of preparing the novel compounds as well as the novel compounds thus prepared.

The novel compounds of the invention have the general formula:

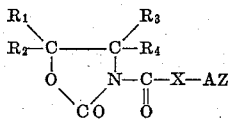

wherein:
(a) $R_1$, $R_2$, $R_3$, $R_4$ each represent a radical selected from within the group consisting of:
  a hydrogen atom,
  a lower alkyl residue such as methyl, ethyl, propyl, butyl,
  an aralkyl residue such as benzyl, phenethyl, phenyl-isopropyl,
  a cycloalkyl residue such as cyclopropyl, cyclopentyl, cyclohexyl, cycloheptyl, possibly substituted with one or more lower alkyl groups up to $C_4$,
  a phenyl and thienyl groups, possibly substituted with one or more halogens such as F, Cl, Br, and radicals such as $CF_3$, OH, $NO_2$, $NH_2$, lower alkoxy and methylenedioxy,
(b) two of the radicals $R_1$, $R_2$ or $R_3$, $R_4$ may jointly represent a polymethylene chain —$(CH_2)_n$—, which may be branched and wherein $n$ may take any value from 2 through 6, (It is to be understood that if two radicals $R_1$ and $R_3$ positioned on the adjacent carbons 4 and 5 are different, while $R_2$ and $R_4$ are identical, or again if all four radicals $R_1$, $R_2$, $R_3$, $R_4$ are different, the resulting compounds will exist in the cis and trans alternative forms, and that both forms, as well as any diastereo-isomers thereof, form part of the present invention.)

(c) X represents an oxygen or a sulfur atom or a —NH— group.
(d) A represents a straight or branched alkane chain having from 2 to 5 carbon atoms, such as:

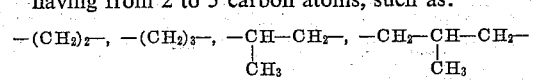

(e) Z represents an aliphatic amino residue such as:

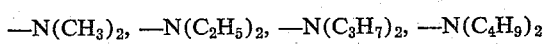

or a heterocyclic residue such as piperidino, morpholino, pyrrolidino, N-methyl-piperazino, N-piperonyl-piperazino, or the like.

The novel 2-oxazolidinone derivatives may be prepared according to the invention by reacting an acid chloride, in either cis or trans or racemic or optically active configuration where applicable, having the general formula:

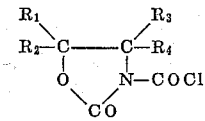

with a basic compound of general formula Y—AZ, where Y is an OH or $NH_2$ group, and the symbols R, Z and A have the meanings given above.

Desirably the reaction is performed in a solvent medium which comprises an aromatic hydrocarbon such as benzene, or an aliphatic or heterocyclic ether (e.g., tetrahydrofurane) in the presence of an excess of the compound Y—AZ or a tertiary base (triethylamine or pyridine) acting as a hydroacid acceptor.

It is found especially desirable to add a solution of the acid chloride in the selected solvent, to a solution of the Y—AZ compound in the same solvent. The reaction should proceed at moderate temperature, in the range from ambient to about 70° C.

The novel 2-oxazolidinone derivatives, which constitute strong bases, may be purified by conventional physical technics such as crystallization, chromatography, or chemical technics such as salt-forming reactions with inorganic or organic acids, crystallization of the salt from an appropriate solvent and breakdown in an alkaline medium. In such operations the nature of the anion used is immaterial provided it will form a definite and readily crystallizable salt.

The bases are usually stored in the form of addition salts thereof.

Moreover, as addition salts with inorganic acids the following may be mentioned: hydrochlorides, hydrobromides, sulphates, phosphates, methane-sulfonates. Addition salts with organic acids may include acetate, propionate, maleate, fumarate, succinate, benzoate, tartrate, malate, oxalate.

The ensuing examples, given for purposes of illustration but not of limitation, will provide an understanding of the manner in which the invention may be practiced. The melting points indicated were determined with the Kofler test. Yields are given in terms of the initial acid chloride.

*Example 1.—2'-dimethylaminoethyl (d,l)-cis (2-oxo 4-methyl 5-phenyl 3-oxazolidinyl) carboxylate*

A solution containing 4.5 g. of (d,l)-cis (2-oxo 4-methyl 5-phenyl 3-ozazolidinyl) carboxyl acid chloride (melting at 115° C.) in 90 cm.³ anhydrous benzene was added dropwise over a period of 25 minutes and while cooling to 10° C., to a solution containing 3.35 g. dimethylaminoethanol in 10 cm.³ anhydrous benzene. On completion of the addition, the mixture was agitated another 2½ hours at ordinary temperature. It was then treated with water, allowed to settle, and the benzene layer was extracted with several batches of 7% hydrochloric acid. The acid batches were combined, washed several times with ether and adjusted to pH 9 with potassium carbonate, and then extracted with several batches of ether. The combined ether extracts were washed several times with water and dried over potassium carbonate. After evaporation under reduced pressure and at low temperature, 5.5 g. were obtained of a base melting at 54° C., with a yield of 100%.

When maleic acid solution was added to the preceding base in ethanol, there was obtained the acid maleate, M.P. 138° C. The initial acid chloride was prepared by reacting a solution of phosgene in toluene with a suspension of (d,l)-cis (4-methyl 5-phenyl 2-oxazolidinone), M.P. 146° C., in the presence of pyridine, in a benzene medium.

By a similar procedure the applicant has prepared each of the following compounds:

(a) *2'-diethylaminoethyl (d,l)-cis (2-oxo 4-methyl 5-phenyl 3-oxazolidinyl) carboxylate.*—The acid oxalate of this compound melts at 140° C., from 2-diethylamino ethanol.

(b) *3'-pyrrolidino 2'-propyl (d,l) cis (2-oxo 4-methyl 5-phenyl 3-oxazolidinyl) carboxylate.*—The acid fumarate melts at 172–175° C. (with decomposition) from 3-pyrrolidino 2-propanol.

(c) *2'-piperidino ethyl (d,l) cis (2-oxo 4-methyl 5-phenyl 3-oxazolidinyl) carboxylate,* M.P. 98° C.—The acid fumarate melts at 149° C. from 2-piperidino-ethanol.

(d) *3-dimethylamino propyl (d,l) cis (2-oxo 4-methyl 5-phenyl 3-oxazolidinyl) carboxylate.*—The hydrochloride melts at 151° C. from 3-dimethylamino propanol.

(e) *2'-dimethylamino ethyl (d,l) trans (2-oxo 4-methyl 5-phenyl 3-oxazolidinyl) carboxylate.*—The hydrochloride melts at 167° C. from 2-dimethylamino ethanol and the chloride of (d,l) trans (2-oxo 4-methyl 5-phenyl 3-oxazolidinyl) carboxyl acid, melting at 69° C., prepared by the method described in Example 1, from (d,l) trans-4-methyl 5-phenyl 2-oxazolidinone melting at 118° C.

(f) *2'-dimethylaminoethyl (d,l) (2-oxo 4-methyl 5,5-diphenyl 3-oxazolidinyl) carboxylate.*—The acid fumarate melts at 170° C., from dimethylamino ethanol and the chloride of (d,l) (2-oxo 4-methyl 5,5-diphenyl 3-oxazolidinyl) carboxyl acid (an oil) prepared as follows. To a solution containing 8.2 g. 4-methyl 5,5-diphenyl 2-oxazolidinone, M.P. 232° C., in 200 cm.³ anhydrous tetrahydrofurane, there is added in a single batch 1.87 g. of a 50% suspension of HNa in mineral oil. The mixture is heated one hour at reflux. The resulting solution is cooled to 20° C. and poured over a period of 15 minutes into 80 g. of a 20% solution of phosgene in toluene, at 10° C. Sodium chloride precipitates. The mixture is stirred one hour at the boil, cooled, the salt is filtered and evaporated under reduced pressure and at low temperature. The resulting viscous residue is thoroughly mixed with ether. The insoluble which comprises the unreacted starting material is filtered, and the filtrate is evaporated under reduced pressure and at low temperature. The oily residue is used for the esterification reaction.

The initial oxazolidinone was prepared by a Curtius degradation reaction from (3,3-diphenyl 3-hydroxy 2-methyl propionyl) hydrazine, M.P. 205° C., which in turn was prepared by reacting hydrazine hydrate with 3,3-diphenyl 3-hydroxy 2-methyl propionate of methyl in ethanol at reflux.

(g) *Acid fumarate of dimethyl amino ethyl (2-oxo 5-phenyl 3-oxazolidinyl) carboxylate.*—To a solution containing 12.7 g. dimethylaminoethanol in 50 cm.³ dry benzene, there are added over a period of 30 minutes 13.9 g. (d,l) (2-oxo 5-phenyl 3-oxazolidinyl) carboxyl acid chloride dissolved in 200 cm.³ dry benzene. The internal temperature rises from 20 to 30° C. and an abundant precipitate forms. The mixture is heated one hour at 50° C., then cooled and treated with twice 100 cm.³ water. The benzene solution is then extracted with several batches of 10% hydrochloric acid. The acid solutions are combined and made alkaline with potassium carbonate. The mixture is extracted with several batches of ether and the ether solutions are dried over potassium carbonate. After ether evaporation under reduced pressure, there are obtained 15 g. of an oily base, whereof the acid fumarate melts at 137° C.

The initial acid chloride, which was not isolated, was prepared by reacting an excess of phosgene with a toluene suspension of the sodium salt of 5-phenyl 2-oxazolidinone melting at 89° C.

(h) *Dimethylamino-ethyl (2-oxo 5,5-diphenyl 3-oxazolidinyl) carboxylate,* M.P. 117° C.—The corresponding hydrochloride melts at 210° C.

(i) *(4'-methyl 1'-piperazinyl) ethyl (2-oxo 5,5-diphenyl 3-oxazolidinyl) carboxylate,* M.P. 200–202° C.—The bis-methane sulfonate melts at 238° C. (with dec.).

(j) *Dimethylaminoethyl (d,l) (2-oxo 5-phenyl 5-ethyl 3-oxazolidinyl) carboxylate.*—The corresponding acid fumarate melts at 160° C.

(k) *Dimethylaminoethyl (d,l) cis (2-oxo 4-methyl 5-cyclohexyl 3-oxazolidinyl) carboxylate.*—The hydrochloride melts at 165° C. The initial acid chloride, which has not been isolated, was prepared from (d,l) cis (4-methyl 5-cyclohexyl 2-oxazolidinone) M.P. 123° C., prepared in turn by a cyclizing reaction of (d,l) cis (1-cyclohexyl 2-amino 1-propanol) with phosgene in the presence of potassium hydroxide, the dihydrochloride of the 1-propanol melts at 217° C.

(l) *Dimethylaminoethyl (d,l) cis (2-oxo 4-phenyl 5-methyl 3-oxazolidinyl) carboxylate,* melting at 77° C.—The corresponding acid fumarate melts at 149–150° C. The starting acid chloride, not isolated, was prepared from (d,l) cis (5-methyl 4-phenyl) 2-oxazolidinone melting at 106° C., prepared in turn by a cyclizing reaction of 1-phenyl 1-amino 2-propanol with ethyl carbonate in the presence of traces of sodium methylate.

(m) *Dimethylaminoethyl (2-oxo 5,5-pentamethylene 3-oxazolidinyl) carboxylate.*—The corresponding hydrochloride melts at 208° C. (with dec.).

(n) *Dimethylaminoethyl cis (2-oxo 4,5-diphenyl 3-oxazolidinyl) carboxylate,* M.P. 145° C.—The hydrochloride melts at 210° C.

(o) *Dimethylaminoethyl (d,l) (2-oxo 5-propyl 3-oxazolidinyl) carboxylate.*—The hydrochloride melts at 110° C. with decomposition.

The initial acid chloride, not isolated, was prepared from 5-propyl 3-oxazolidinone (B.P.$_{5\text{ mm}}$: 225–230° C.), prepared in turn by a Curtius degradation of 3-hydroxy cynoylhydrazine (M.P. 102° C.), prepared in turn by the action of hydrazine on ethyl 3-hydroxy caproate.

(p) *Dimethylaminoethyl (d,l) (2-oxo 5-benzyl 3-oxazolidinone) carboxylate.*—The acid fumarate melts at 150° C. (with dec.).

The initial acid chloride, not isolated, was prepared from 5-benzyl 2-oxazolidinone, M.P. 103° C., prepared by a Curtius degradation of 3-benzyl 3-hydroxy propionyl hydrazine (M.P. 102° C.) prepared in turn by action of hydrazine on ethyl 3-benzyl 3-hydroxy propionate (B.P.$_{2\text{ mm}}$: 140–145° C.).

(q) *Dimethylaminoethyl (d,l) 5-[(3',4'-methylenedioxy phenyl) 2-oxo 3-oxazolidinyl] carboxylate.*—The hydrochloride melts at 187° C.

The initial acid chloride, not isolated, was prepared from 5-(3',4'-methylenedioxy phenyl) 2-oxazolidinone melting at 128° C., prepared in turn by phosgene cyclization in the presence of potassium hydroxide, of 1-(3',4'-methylenedioxy phenyl) 2-amino 1-ethanol, the hydrochloride of which melts at 196° C., and itself prepared by reduction of piperonal cyanhydrine with AlKH$_4$ in tetrahydrofurane.

(r) *Dimethylaminoethyl (5,5-dithienyl 2-oxo 3-oxazolidinyl) carboxylate.*—The hydrochloride melts at 178° C.

The initial acid chloride, not isolated, was prepared from 5,5-dithienyl 2-oxazolidinone (M.P. 146° C.), prepared in turn by phosgene cyclization of 1,1-dithienyl 2-amino 1-ethanol in the presence of potassium hydroxide.

(s) *Dimethylaminoethyl (d,l) (2-oxo 5-phenyl 5-cyclohexyl 3-oxazolidinyl) carboxylate.* — The hydrochloride melts at 225° C.

The initial acid chloride, not isolated, was prepared from 5-phenyl 5-cyclohexyl 2-oxazolidinone, melting at 190° C., prepared in turn by Curtius degradation of 3-cyclohexyl 3-phenyl 3-hydroxy propionyl hydrazine, M.P. about 92° C.

*Example 2.* — *2'-morpholino ethyl (d,l) cis (2-oxo 4-methyl 5-phenyl 3-oxazolidinyl) carboxylate*

A solution of 12 g. of the chloride of (d,l) cis (2-oxo 4-methyl 5-phenyl 3-oxazolidinyl) carboxyl acid in 250 cm.³ anhydrous benzene was added dropwise at 10° C. over a period of 25 minutes to a solution containing 6.05 g. morpholino ethanol and 5.05 g. triethylamine in 20 cm.³ anhydrous benzene. The mixture was stirred another 2½ hours then treated as in Example 1. There was finally obtained 10.4 g. of a base melting at 88° C., and the acid fumarate of which melts at 149° C. The yield was 60%.

*Example 3.—(d,1) Cis (2-oxo 4-methyl 5-phenyl 3-oxazolidinyl) N-dimethylaminoethyl carboxamide*

To a solution containing 22.5 g. of the chloride of (d,1) cis (2-oxo 4-methyl 5-phenyl 3-oxazolidinyl) carboxyl acid melting at 115° C., in 250 cm.³ anhydrous tetrahydrofurane, there was added dropwise over a period of 15 minutes a solution containing 16.5 g. dimethylaminoethylamine in 50 cm.³ tetrahydrofurane. The temperature rose from 19 to 31° C. while a precipitate formed. On completion of the pouring the mixture was heated at 50° C. for 75 minutes, then the solvent was evaporated under reduced pressure. The pasty residue was dissolved in 200 cm.³ water, adjusted to pH 9 with potassium carbonate and extracted with several batches of ether. The ether batches were combined and washed several times with water and dried over dry potassium carbonate. After solvent evaporation under reduced pressure, there was obtained 25 g. of a crude oily base.

By adding hydrochloric ether to a solution of this base in isopropanol, there are finally obtained 25.7 g. hydrochloride melting at 197° C. The yield is 83.6%

The compounds according to the invention have advantageous properties as synthesis intermediates in the chemical industry as well as having fungicidal activity in addition to their therapeutic uses now to be described.

The 2-oxazolidinone derivatives of the invention have been subjected to pharmacological tests and shown to possess analgesic, antipyretic and anti-inflammatory activity of a high order. Moreover some of the compounds have been found to have anti-tussive and anti-convulsive activity and to antagonize the action of bradykinine.

Toxicity tests on the mouse have shown that LD 50, as determined by the method of Lichfield and Wilcoxon, varies over a range from 223 to 1,400 mg./kg. (intraperitoneally) depending on the compound tested.

The analgesic activity, tested on the mouse by Woolf and MacDonald's hot plate method, shows that 200 mg./kg. doses are capable of doubling the reaction time.

Anti-inflammatory activity, tested in connection with plantary oedema induced in the rat by sub-aponevrotic injection of kaolin, has demonstrated a very high oedema-inhibiting action, as high as 37%, on oral absorption of the novel compounds.

It has also been shown that certain compounds of the series are capable of opposing broncho spasms induced by bradykinine, at a dose of 5 mg./kg.

Clinically it has been shown that the compounds, when given three times per diem in the form of tablets containing 0.25 g. of the active principle, over a period of 15 days, greatly reduce the pain experienced by patients suffering from chronic evolutive polyarthritis, and the treatment when extended over two months results in a very definite functional improvement in the motility of the diseased joints. The compounds are very well tolerated and have not been found to produce any secondary effects.

The novel compounds may be used with any appropriate pharmacological carriers in the form of tablets, suppositories and injectable solutions, in doses of from 0.10 to 1 g. active principle, in the treatment of painful and inflammatory syndromes of any origin, including arthralgia, myalgia, neuralgia of rheumatic or other origin, and as antitussive agents.

What we claim is:

1. The compound 2′-dimethylamino ethyl (d,1)-cis(2-oxo 4-methyl 5-phenyl-3-oxazolidinyl) carboxylate.

2. The compound 2′-dimethylamino ethyl (d,1) (2-oxo 4-methyl 5,5-diphenyl 3-oxazolidinyl) carboxylate.

3. The compound dimethyl-amino-ethyl (2-oxo 5-phenyl 3-oxazolidinyl) carboxylate acid fumarate.

4. The compound dimethylamino-ethyl (2-oxo 5,5-diphenyl 3-oxazolidinyl) carboxylate.

5. The compound dimethylaminoethyl (d,1) (2-oxo 5-phenyl 5-ethyl 3-oxazolidinyl) carboxylate.

6. The compound dimethylamino ethyl (d,1)-cis (2-oxo 4-methyl 5-cyclohexyl 3-oxazolidinyl) carboxylate.

7. The compound dimethylaminoethyl (d,1)-cis (2-oxo 4-phenyl 5-methyl 3-oxazolidinyl) carboxylate.

8. The compound dimethylaminoethyl cis (2-oxo 4,5-diphenyl 3-oxazolidinyl) carboxylate.

9. The compound dimethylaminoethyl (d,1) (2-oxo 5-propyl 3-oxazolidinyl) carboxylate.

10. The compound dimethylaminoethyl (d,1) (2-oxo 5-benzyl 3-oxazolidinyl) carboxylate.

11. The compound dimethylaminoethyl (d,1) 3′, 4′-methylenedioxy 5-phenyl 2-oxo 3-oxazolidinyl) carboxylate.

12. The compound dimethylamino (5,5-dithienyl 2-oxo 3-oxazolidinyl) carboxylate.

13. The compound dimethylaminoethyl (d,1) (2-oxo 5-phenyl 5-cyclohexyl 3-oxazolidinyl) carboxylate.

14. The compound (d,1)-cis (2-oxo 4-methyl 5-phenyl 3-oxazolidinyl) N-dimethylaminoethyl carboxamide.

15. A compound selected from the group consisting of 2-oxazolidinone amines and acid addition salts thereof, said 2-oxazolidinone amines having the formula:

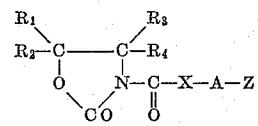

wherein each of $R_1$, $R_2$, $R_3$, and $R_4$ is independently selected from the group consisting of hydrogen, loweralkyl, phenyl-lower-alkyl having up to a maximum of nine carbon atoms, cycloalkyl having up to a maximum of eleven carbon atoms and having three up to a maximum of seven carbon atoms in the ring, phenyl, fluorophenyl, chlorophenyl, bromophenyl, trifluoromethylphenyl, hydroxyphenyl, nitrophenyl, aminophenyl, lower - alkoxyphenyl, methylenedioxyphenyl, thienyl, fluorothienyl, chlorothienyl, and bromothienyl, wherein X is selected from the group consisting of an oxygen atom and the —NH— group, wherein A is alkylene having two up to a maximum of five carbon atoms, and wherein Z is selected from the group consisting of diloweralkylamino, piperidino, morpholino, pyrrolidino, N-methylpiperazino, and N-piperonylpiperazino.

References Cited by the Examiner

UNITED STATES PATENTS

| | | | |
|---|---|---|---|
| 1,915,334 | 6/33 | Salzberg et al. | 260—243 |
| 2,075,359 | 3/37 | Salzberg et al. | 167—22 |
| 2,425,320 | 8/47 | Hill | 252—149 |
| 2,800,426 | 7/57 | Kaellner et al. | 167—65 |
| 2,804,422 | 8/57 | Schumann et al. | 167—65 |
| 3,088,947 | 5/63 | Giraldi et al. | 260—247.2 |

OTHER REFERENCES

Close, "J. Am. Chemical Society," vol. 73, pages 95–98 (1951).

Newman et al., "J. Am. Chemical Society," vol. 73, pages 4199–4204 (1951).

IRVING MARCUS, *Primary Examiner*.

NICHOLAS S. RIZZO, WALTER A. MODANCE,
*Examiners.*

UNITED STATES PATENT OFFICE
CERTIFICATE OF CORRECTION

Patent No. 3,193,559                                July 6, 1965

Gilbert L. Regnier et al.

It is hereby certified that error appears in the above numbered patent requiring correction and that the said Letters Patent should read as corrected below.

Column 2, line 49, for "3-ozazolidinyl)" read -- 3-oxazolidinyl) --; column 4, line 35, for "cynoylhydrazine" read -- caproyl hydrazine --; column 6, line 22, for "dimethylamino" read -- dimethylaminoethyl --.

Signed and sealed this 19th day of April 1966.

(SEAL)
Attest:

ERNEST W. SWIDER
Attesting Officer

EDWARD J. BRENNER
Commissioner of Patents